United States Patent [19]
Eltgen

[11] Patent Number: 5,610,633
[45] Date of Patent: Mar. 11, 1997

[54] AGENT FOR MAGNETOGRAPHIC PRINTERS AND USE OF SUCH AN AGENT

[75] Inventor: Jean-Jacques Eltgen, Danjoutin, France

[73] Assignee: Nipson, Belfort, France

[21] Appl. No.: 277,743

[22] Filed: Jul. 20, 1994

[30] Foreign Application Priority Data

Jul. 21, 1993 [FR] France .................. 93 08969

[51] Int. Cl.$^6$ ............... B41J 2/415; B41J 2/385; G11B 9/00
[52] U.S. Cl. ........................... 346/74.2; 347/131
[58] Field of Search ............ 346/74.2; 430/31; 347/111, 112, 131; 428/900, 928; 360/115, 113; 324/252

[56] References Cited

U.S. PATENT DOCUMENTS

| | | | |
|---|---|---|---|
| 4,798,622 | 1/1989 | Pingaud | 252/62.56 |
| 5,147,732 | 9/1992 | Shiroishi et al. | 428/928 |
| 5,153,796 | 10/1992 | Gooch | 360/115 |
| 5,304,975 | 4/1994 | Saito et al. | 360/113 |
| 5,386,332 | 1/1995 | Jagielinski et al. | 428/900 |

FOREIGN PATENT DOCUMENTS

2600178 12/1987 France .
8204344 12/1982 WIPO .

*Primary Examiner*—Benjamin R. Fuller
*Assistant Examiner*—Raquel Yvette Gordon
*Attorney, Agent, or Firm*—Kerkam, Stowell, Kondracki & Clarke, P.C.; Edward J. Kondracki

[57] ABSTRACT

The present invention relates to an agent for magnetographic printers that includes a plurality (k) of elementary magnetic layers, having relatively hard hysteresis cycles with a threshold effect and marked saturation, of which the coercivity and/or thickness of the layers varies as a function of the position of the layer on a soft magnetic substrate.

25 Claims, 8 Drawing Sheets

| ADDRESSABLE DOTS (dpi) | GREY LEVELS OF THE DOTS (nb) | PIXEL STRUCTURE (dot X dot) | GREY SCALE (nb) | IMAGE RESOLUTION (ppi) | FRAME RESTORATION (lpi) | IMAGE QUALITY SCALE |
|---|---|---|---|---|---|---|
| 240 | 1 | 2 X 2 | 4 | 120 | 60 | << NEWSPAPER QUALITY |
| 240 | 1 | 4 X 4 | 16 | 60 | 30 | << NEWSPAPER QUALITY |
| 240 | 2 | 2 X 2 | 8 | 120 | 60 | < NEWSPAPER QUALITY |
| 240 | 4 | 2 X 2 | 16 | 120 | 60 | ≤ NEWSPAPER QUALITY |
| 480 | 1 | 4 X 4 | 16 | 120 | 60 | ≤ NEWSPAPER QUALITY |
| 480 | 2 | 2 X 2 | 8 | 240 | 120 | ≤ MAGAZINE QUALITY |
| 480 | 4 | 2 X 2 | 16 | 240 | 120 | ≈ MAGAZINE QUALITY |
| 960 | 1 | 4 X 4 | 16 | 240 | 120 | ≈ MAGAZINE QUALITY |
| 960 | 2 | 2 X 2 | 8 | 480 | 240 | ≤ GRAPHIC ARTS |
| 960 | 4 | 2 X 2 | 16 | 480 | 240 | = GRAPHIC ARTS |
| 1200 | 1 | 4 X 4 | 16 | 300 | 150 | = MAGAZINE QUALITY |

AGENT FOR MAGNETOGRAPHIC PRINTERS AND USE OF SUCH AN AGENT

FIELD OF THE INVENTION

The present invention relates to an agent for magnetographic printers and its use for printing different shades of grey on a print medium.

BACKGROUND OF THE INVENTION

Figure 5:
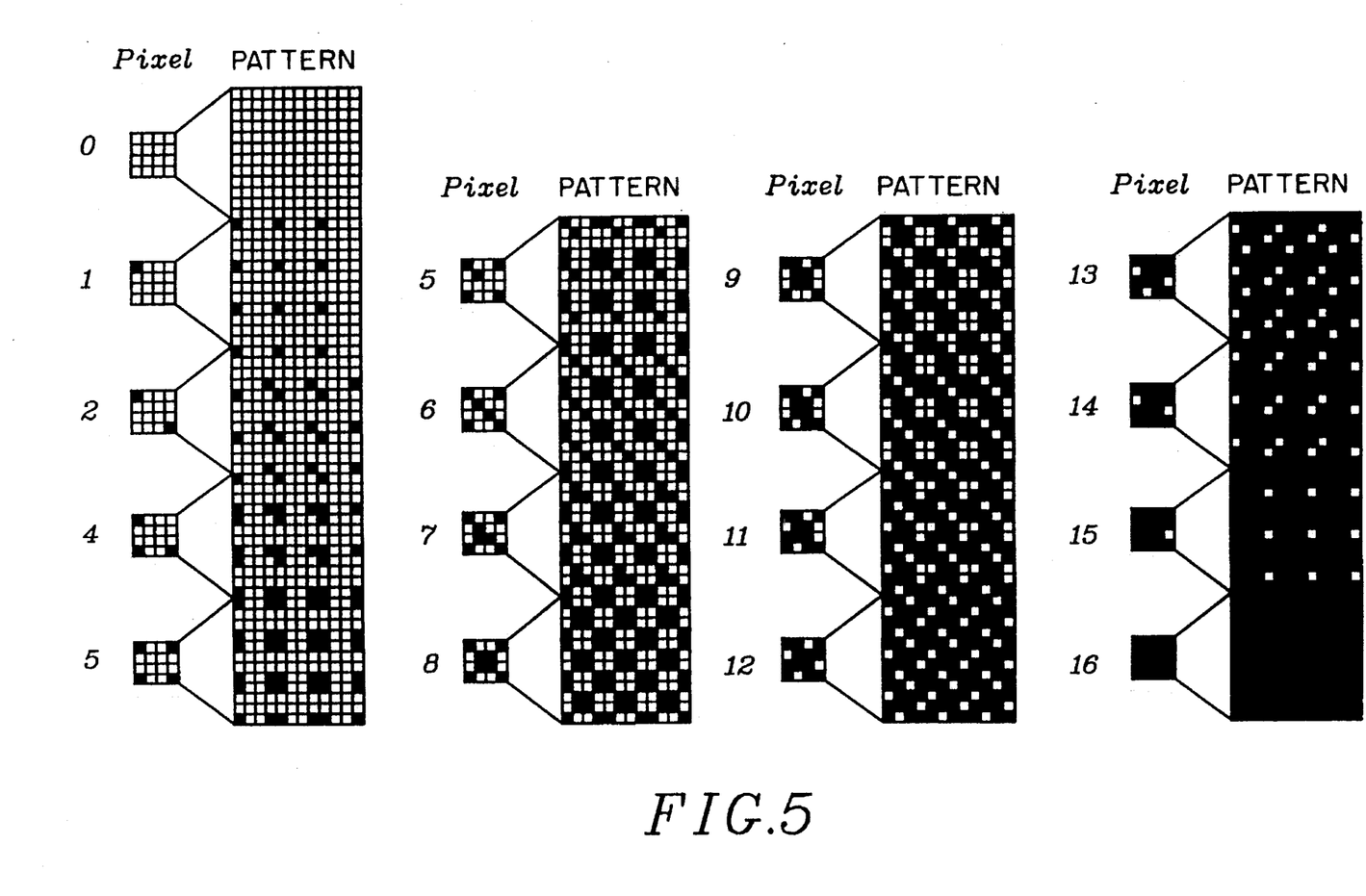
FIG. 5 shows examples of images with 16 grey shades obtained by the method of the prior art.

In the current state of known embodiments, magnetography is essentially a digital technique, which makes it possible to have grey scales but to the detriment of the image resolution. Hence for a given addressability, the dots making up the image are either magnetically unsaturated or as close as possible to saturation. As a result, the reflectance of the positions in the mapping grid assume only two values, white and black. Under these conditions, a scale of grey shades can be made up only by using a picture element or "pixel" composed of several dots, by a method sometimes called "dithering". In general, the pixel is made up of a square n×n in size, thus offering $n^2$ different levels of grey, as shown in FIG. 5. Digital resolution of the greys by using a pixel with n×n dots has the grave disadvantage of reducing the image resolution R in the ratio n. For example, for an addressability that represents the spatial density of the theoretical grid of the addressable dots, that is, 240 dots per inch (dpi) that can be written upon and a 4×4 pixel allowing 16 grey levels, The image resolution drops to 60 pixels per inch (ppi), which is manifestly too low for the eye to correctly integrate the reflectances of the various dots of the pixel so as to obtain the mean value thereof. If one wishes to preserve an image resolution of 240 ppi, then the alternative consists of using addressability that is four times greater, that is, 960 dpi. Obtaining such densities cannot be done without encountering serious problems in making the requisite writing head bars in high-speed parallel printers.

SUMMARY OF THE INVENTION

Accordingly, the object of the present invention is to propose an agent that makes it possible to generate images having a sufficient number of shades of grey without degrading the addressability or resolution of the image.

This object is attained by an agent for magnetographic printers that includes a plurality (k) of elementary magnetic layers, having relatively hard hysteresis cycles with a threshold effect and marked saturation, wherein the coercivity and/or thickness of the layers varies as a function of the position of the layer on a soft magnetic substrate.

In another embodiment, the agent for magnetographic printers includes a plurality (k) of elementary magnetic layers, having relatively hard hysteresis cycles with a threshold effect and marked saturation, each having the same thickness and different coercivity, the coercivity increasing in the direction of the layers deposited in depth in the soft magnetic substrate.

In another particular feature, the agent is used with demagnetization lines having identical slopes for each layer.

In another embodiment, the layers are of the same coercivity and have decreasing thickness in the direction of the layers deposited in depth in the soft magnetic substrate.

In another feature, the agent is used with demagnetization lines having a decreasing slope in the direction of the layers deposited in depth in the soft magnetic substrate.

In another feature, the variation of the coercivities is obtained by doping with hypophosphites and/or adjustment of the current densities of the deposit in the case of layers obtained by electrolytic deposit of cobalt-nickel alloy.

In another feature, the layers are deposited by vacuum sputtering.

In another feature, the different layers are separated by fine nonmagnetic layers, to facilitate the deposit of the next layer and to reduce the magnetic coupling among the various layers.

Another object of the invention is to propose the use of the agent of the invention to make printing with multiple grey shades without increasing the number of writing heads of the writing head bar.

This object is attained by using a soft magnetic substrate coated with an agent with k layers, making it possible, as a function of the different thickness of the layers or the different coercivity of these layers, to obtain k grey levels defined by different masses of toner retainer per unit of surface area, and a head for writing pixels with n×n points. Thus providing $n^2 \cdot (k)$ grey shades on a sheet of paper.

As an example of use, the number n of dots may equal 2, and the number k of layers may equal 3, making 12 final grey levels.

In other example, the number of dots may equal 2, and the number k of layers may equal 2, making 8 final grey levels.

BRIEF DESCRIPTION OF THE DRAWINGS

Further features and advantages of the present invention will become more apparent from the ensuing description of various embodiments of the invention, given by way of non-limiting example, with the aid of the accompanying drawings, in which.

DETAILED DESCRIPTION OF PREFERRED EMBODIMENTS

Figure 1:
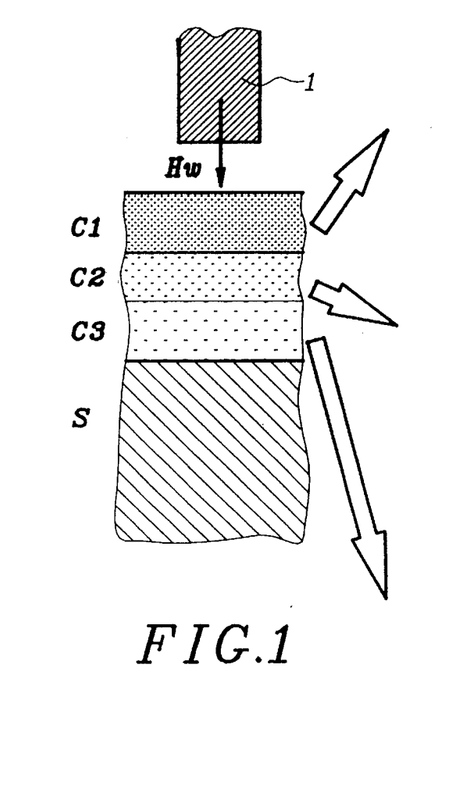
FIG. 1 shows an embodiment of an agent with superimposed layers and writing poles.

FIG. 1 shows a soft magnetic substrate (S), which for example can make up the drum of a magnetographic machine, of the kind known from European Patent Application EP 082 742, or may be continuous tape, or any other agent for a print medium or the like.

Disposed on the substrate (S) are several exemplary magnetic layers C1, C2, C3. Three is the number used in the illustrative example; however, it is understood that this is merely for illustrative purposes and in no way limits to the scope of the invention. These layers are optimally separated by fine nonmagnetic layers to facilitate their deposition. Each layer, as shown in FIG. 2, has a different saturation magnetization (Msi) and a different coercive field (Hci), with the coercive fields and magnetizations having increasing values from one layer to another in the direction of displacement of the writing surface toward the core of the substrate.

Figure 2:
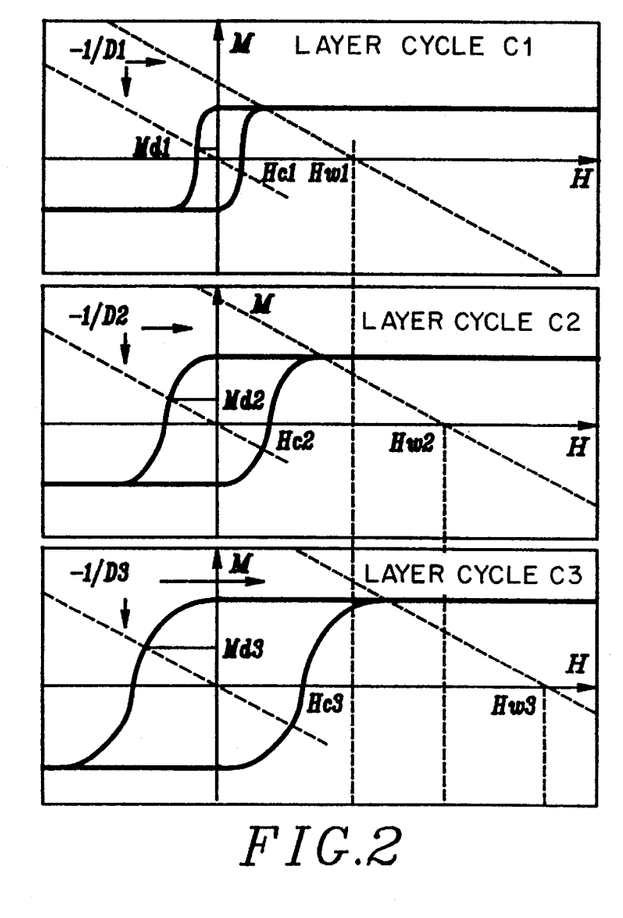
FIG. 2 shows hysteresis cycles of the various layers of the agent.
Figure 3:
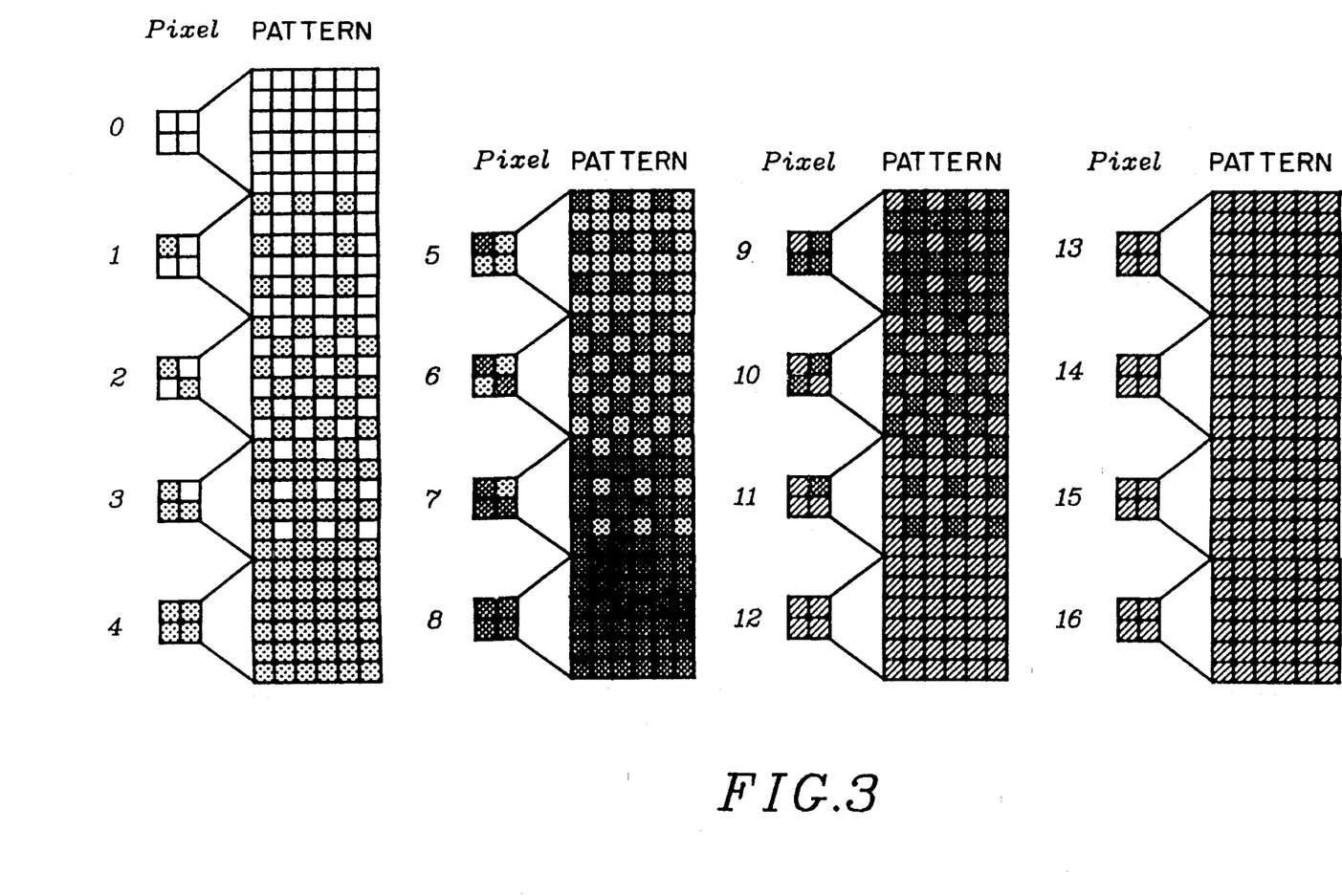
FIG. 3 shows use of a substrate with three layers which is associated with a pixel with four dots (2×2), making twelve grey levels possible.
Figure 4:
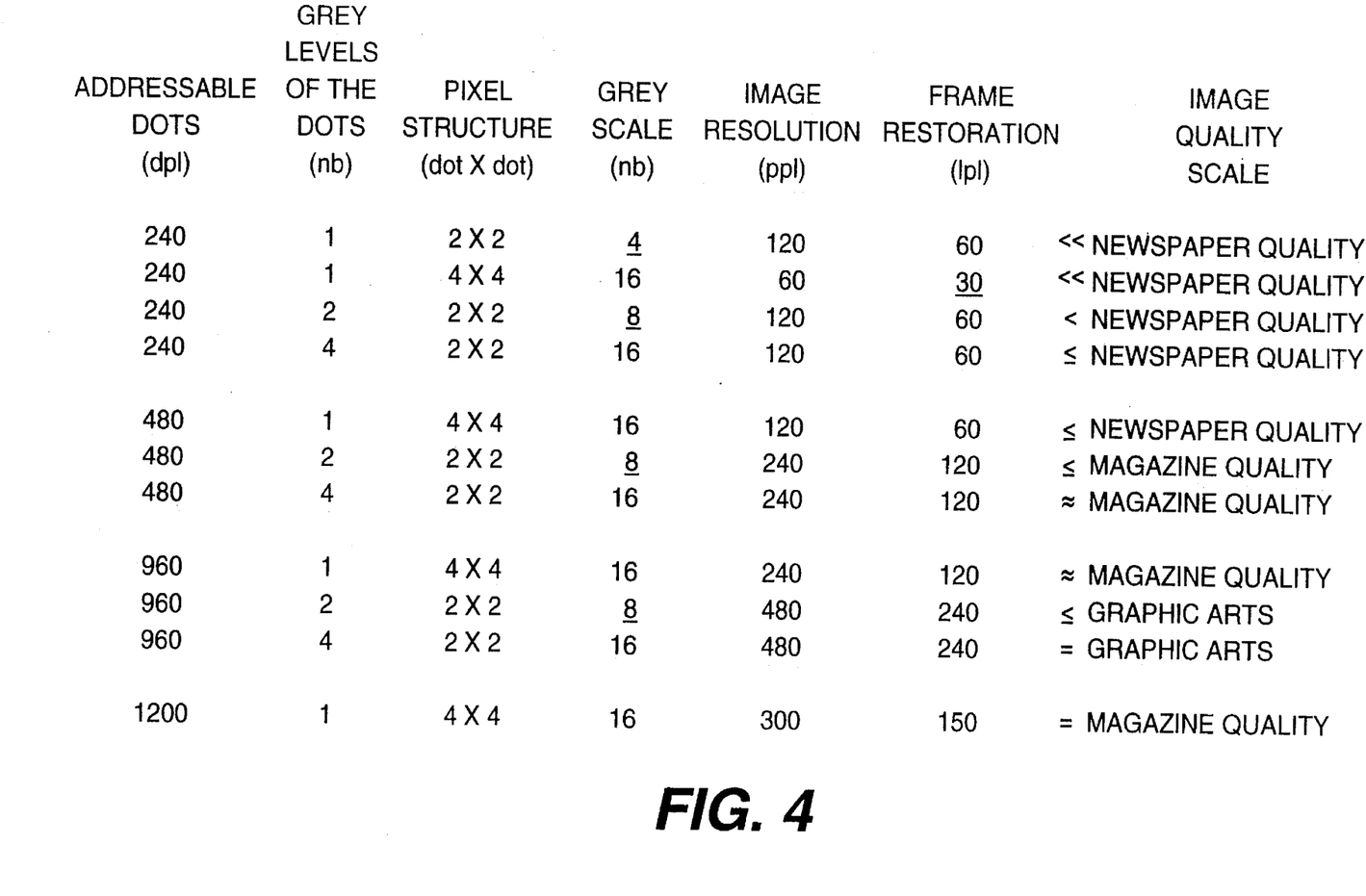
FIG. 4 shows a non-exhaustive table of possible configurations.

In addition, as shown in FIG. 2, each individual layer (Ci) has conventional magnetic properties. Particularly a relatively "hard" hysteresis cycle having a threshold effect and marked saturation. Thus the hysteresis cycle of the layer C3 has a coercive field (Hc3) greater than the coercive field (Hc2) of the cycle of the layer C2. Similarly, the saturation magnetization of the layer C3, Ms3, is greater than the saturation magnetization Ms2 of the layer C2 shown in FIG. 2. The coercive fields (Hci) of the different layers (Ci) are clearly distinct, thereby defining a succession of intervals of disconnected fields. In each of these intervals taken separately, each of the layers is either not significantly written, or practically saturated.

Figure 8:
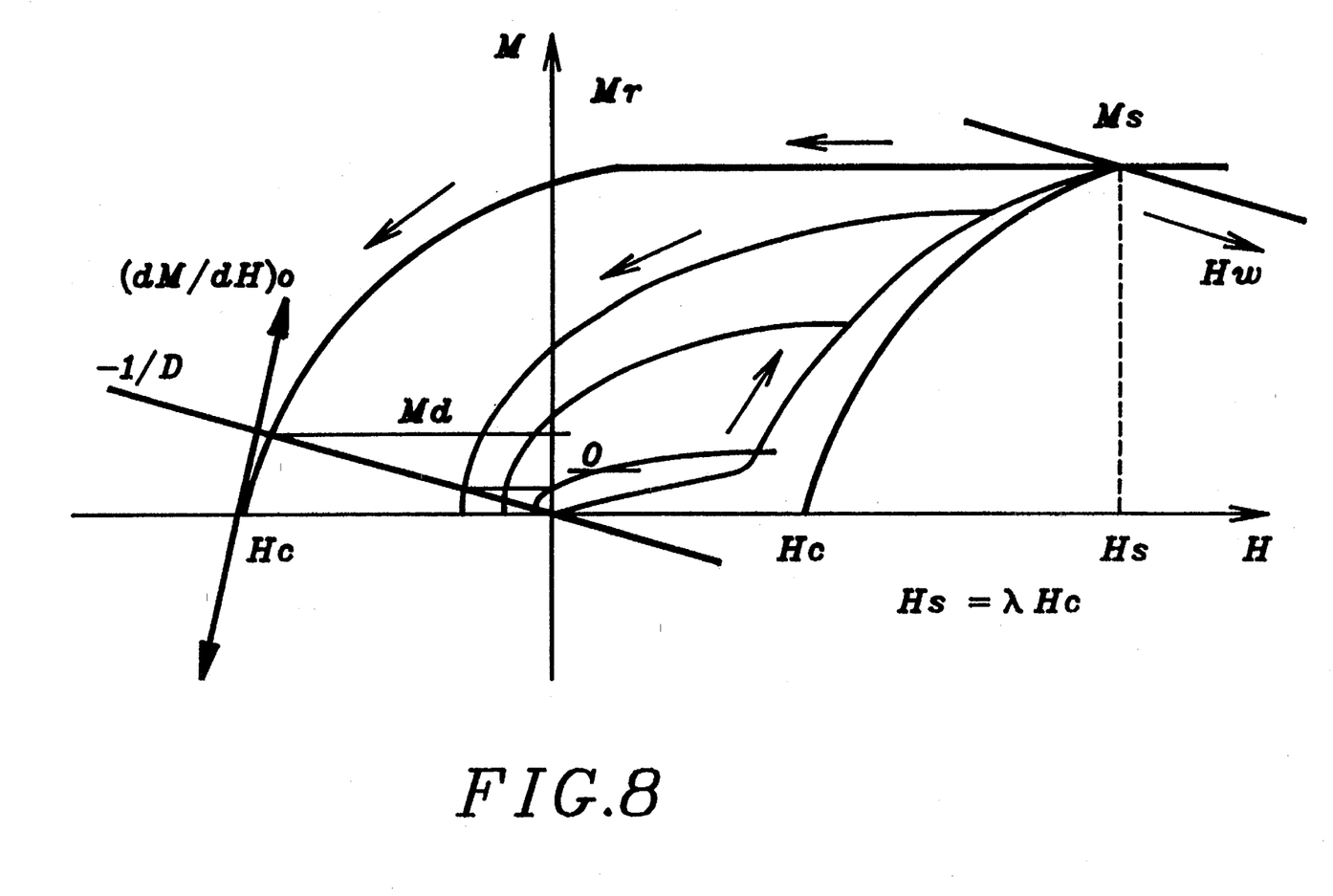
FIG. 8 shows a curve determining the residual magnetization of a layer based on the geometry of the dot defining the demagnetizing factor and the slope of the demagnetization curve.

The coercive field (Hci) is defined by the value for which the curve representing the hysteresis cycle intersects the axis of the field (H), and the saturation field (Hsi) is defined by the value for which the two curves forming the hysteresis cycle come together again as represented by Hs in FIG. 8.

This value (Hsi) can be expressed as a function of the coercive field (Hci) by the equation $Hsi = \lambda i \cdot Hci$.

Associated with each saturation field (Hsi), as a function of the demagnetizing field (Hdi), is a writing threshold field (Hwi) that indicates the values at which writing takes place or below which there is no magnetization, that is determined by the equation $Hwi = Hsi + Hdi$.

The demagnetizing field is linked with the geometry of the elementary dot (thickness in proportion to the magnetized surface area) and with the magnetization taken up by the layer, in accordance with the equation $Hdi = Di \, Msi$, where Di is the demagnetization factor. This equation defines a slope direction $-1/Di$, called the demagnetization direction, in the plane (H, M).

When the demagnetizing field reaches the value of 0 (zero), as a function of its demagnetizing factor (Di) which is represented by the demagnetization curve, which in fact is a straight-line slope $-1/Di$, the magnetic layer (Ci) preserves a residual magnetization (Mdi), which is represented by the projection on the axis of the magnetizations of the point of intersection of the hysteresis cycle with the demagnetization line of slope $-1/Di$, passing through the center (00) of the coordinate system. Hence for a given coercive field (Hci) and for given magnetic properties of the layer (Ci), it would have to be exposed to a magnetization field greater than the writing threshold field (Hwi) in order then, following a demagnetization, to produce a significant residual magnetization (Mdi). The residual magnetization (Mdi) can be expressed by the following equation:

$$M_{di} = H_{ci}(dM/dH)_{0i}/[D_i + (dM/dH)_{0i}]$$

For cycles assumed to be perfectly square and hence which approach the cycles shown in FIG. 2; because $\lambda_i$ is practically equal to 1 (in fact $\lambda i$ depends only on the squareness of the intrinsic cycle, and not on the geometry of the dots), $(dM/dH)_{0i}$ is much higher than 1, which expresses the fact that the slope in the vicinity of the dot H=Hc is pronounced. Finally, for very flat dots, that is, of slight thickness relative to their surface area, Di is practically equal to 1, hence the simpler expression:

$$H_{wi} \approx H_{ci} + M_{si}$$

$$M_{di} \approx Hc_i$$

Figure 6:
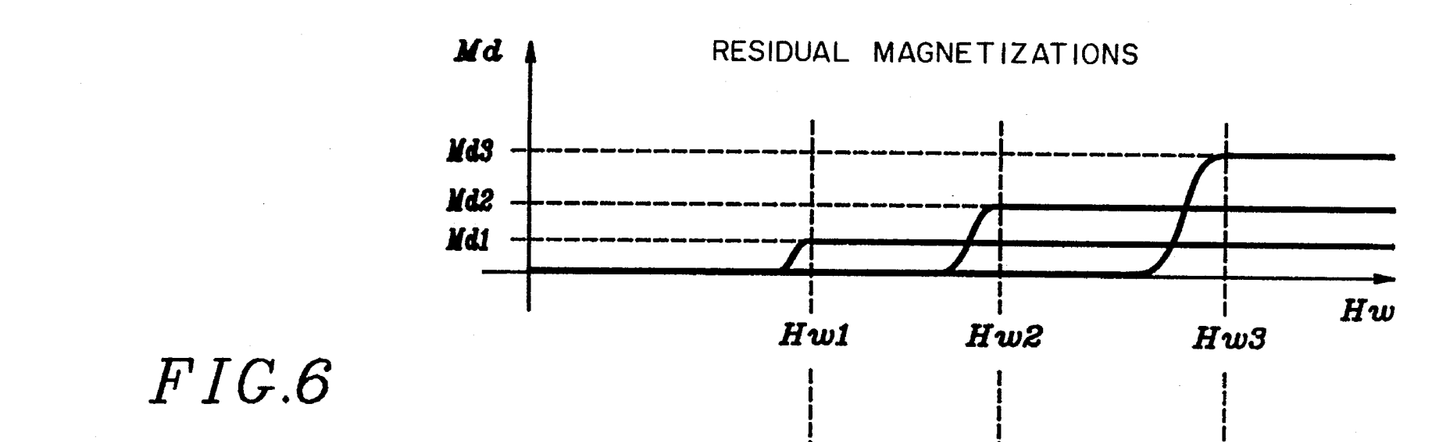
FIG. 6 shows curves of residual magnetization of elementary dots of the various layers of the agent.
Figure 7:
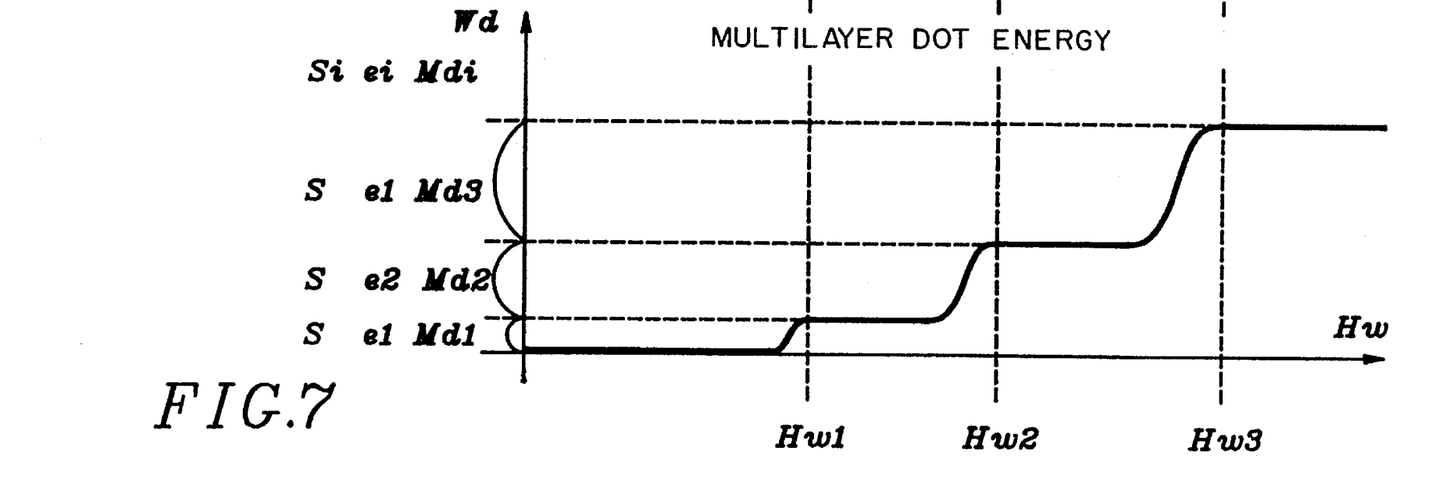
FIG. 7 shows total magnetostatic energy of a dot on a multilayer agent as a function of the writing field of the head.

Accordingly, by exposing a layer (Ci) to a field greater than its writing threshold field ($H_{wi}$), the pixel will, depending on the layer used, have a residual magnetization ($M_{di}$) which corresponds to the residual magnetizations shown in FIG. 6. Since the substrate is made up of a succession of different layers with a different coercive field, the residual magnetization of the dot on a multilayer substrate will correspond in actuality to the curve of FIG. 7 as a function of the writing field levels, thus making it possible for each dot to create four possibilities of grey level representation. These possibilities of gray level representation correspond to the residual magnetization values represented by all the layers, when they are exposed to different threshold fields, as shown in FIG. 7.

Figure 9:
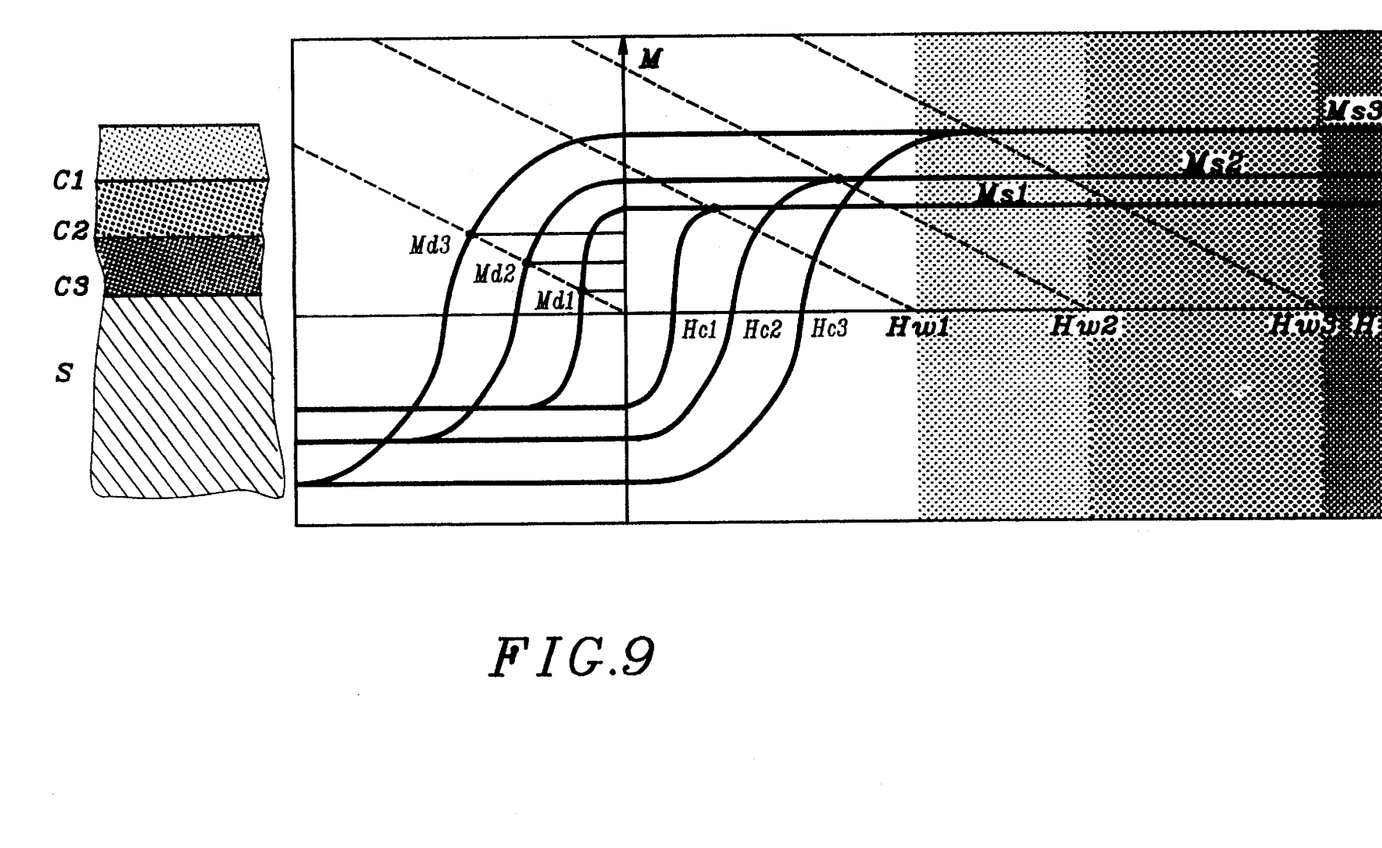
FIG. 9 shows curves that make it possible to determine the threshold fields for an agent with layers of the same thickness but with magnetization at increasing saturation in the direction of the depth of the substrate.

Such an approach allows the use of writing heads with pronounced writing field dispersion for a given excitation current, since this in turn means creating an "energy of the dot/writing field" characteristic that is always strongly non-linear and has a plurality of intermediate saturation thresholds. The version presented in FIGS. 1 and 2 is summarized in FIG. 9, where one can confirm that the three layers of the same thickness used with identical demagnetization line slopes and hence identical demagnetization coefficients must have quite different saturation magnetizations Msi, to enable major differentiation of the threshold fields Hwi. These different writing threshold fields will thus make it possible to achieve three grey levels at the level of the elementary dot. In addition, one can confirm that in this embodiment, the residual magnetizations Mdi increase from the surface layers toward the deeper layers. The variation in the coercivities and consequently the saturation magnetizations is obtained by doping with hypophosphites and/or adjusting the current densities of deposition in the case of electrodeposited magnetic layers made up of cobalt-nickel-phosphorous.

The relationships that have been seen above can be optimized by making measurements with real cycles. In that case, the squarenesses of the hysteresis cycles determine the coefficient $\lambda i$, and generally this coefficient is on the order of two or three as well as the slopes of the dM/dH lines in the vicinity of the coercive field (Hc). The thickness of the various layers compared with the surface area S of the written dots, which in turn depends on the cross section of the writing pole, makes it possible to estimate the demagnetization coefficients Di of these layers and from that to draw the slope $-1/Di$ of the demagnetization function lines. The tracing of these lines then shows the residual magnetizations of the various layers and the writing threshold fields Hwi corresponding to the various levels. The objective is to obtain sufficiently wide zones between the various thresholds Hwi, as in the first embodiment described above.

Figure 10:
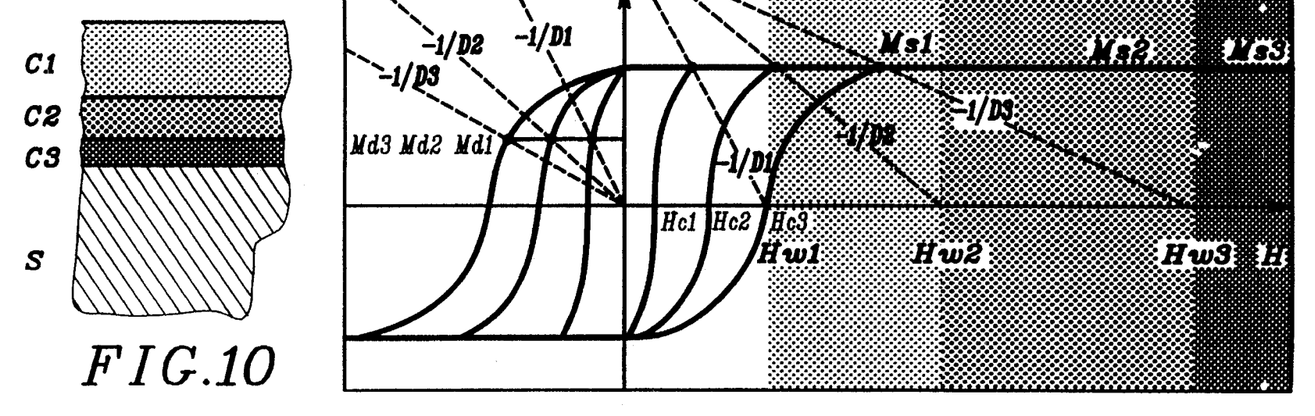
FIG. 10 shows hysteresis curves for an agent with layers of decreasing thickness from the surface toward the substrate and with magnetization at constant saturation for each layer.

The embodiment of FIG. 10 shows another embodiment of the invention, in which the magnetic layers C1, C2, C3 decrease from the surface toward the substrate S, while the demagnetization factors increase in the same direction. Consequently the slopes (−1/Di) of the function lines decrease from the surface toward the substrate S. The divergence among the function lines accentuates the intervals between the writing threshold fields (Hwi), even in the case of layers with the same saturation magnetization. If, in addition, the saturation magnetizations are different for each layer, then the differentiation among threshold fields is improved. Furthermore, this variant also has the effect of making the residual magnetizations (Mdi) closer together. This embodiment is relatively easily achieved, because a succession of coercive fields (Hci) is easily obtained by doping with hypophosphites and/or with adjustments of the current densities of deposit in the case of electrodeposited layers of cobalt-nickel-phosphorous (Co-Ni-P). Conversely, obtaining a succession of saturation magnetizations (Msi) covering a wide zone, as in the case of FIG. 9, proves to be more difficult.

Figure 11:
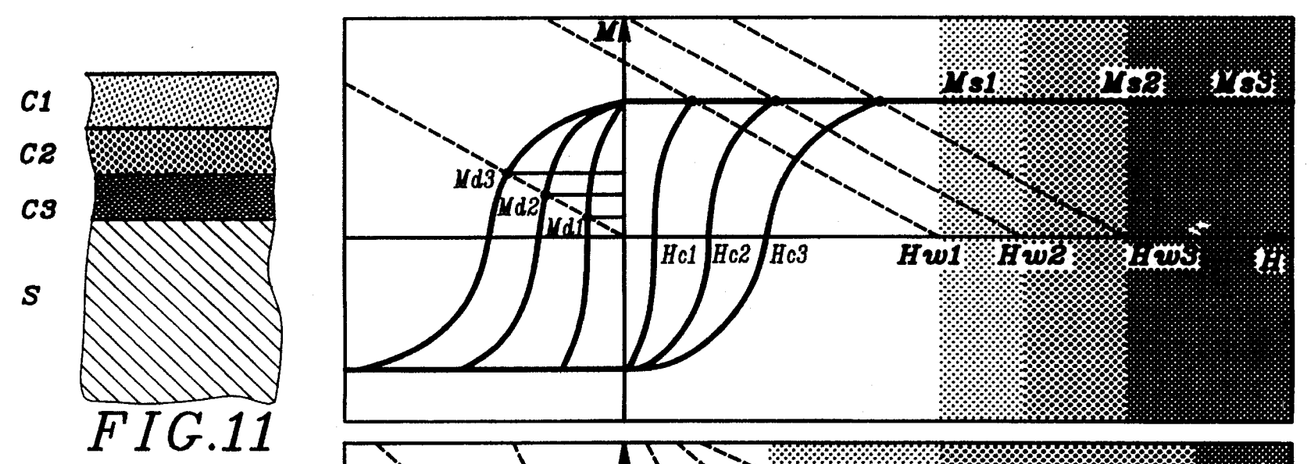
FIG. 11 shows hysteresis curves enabling the determination of threshold fields for an agent made up of layers with the same saturation magnetization and the same thickness.

The use of layers with the same saturation magnetization (Msi) and the same thickness, shown in FIG. 11, which has the consequence of producing identical function line slopes, does not enable obtaining sufficient distances between threshold fields Hwi. In fact, if the distances between threshold fields (Hwi) are too small, then despite the major dispersion of the fields produced by the writing heads, the thresholds will not be sufficient to achieve grey levels that one can easily distinguish.

While this invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the spirit and scope of the invention as described herein and defined in the appended claims.

I claim:

1. An agent for magnetographic printers, comprising:

a plurality (k) of elementary magnetic layers disposed on a soft magnetic substrate, said magnetic layers having relatively hard hysteresis cycles with a defined writing threshold and saturation magnetization, wherein at least one of a coercivity and a thickness of said layers varies as a function of a depth of the layer on said soft magnetic substrate.

2. The agent of claim 1, wherein said layers have a same thickness, each of said layers having a different coercivity, said coercivity increasing in a direction in which the layers are deposited in the soft magnetic substrate.

3. The agent of claim 2, wherein said agent is used with demagnetization lines that have identical slopes for each said layer.

4. The agent of claim 1, wherein said layers have a same coercivity and decreasing thickness, said thickness decreasing in a direction in which the layers are deposited in the soft magnetic substrate.

5. The agent of claim 4, wherein said agent is used with demagnetization lines that have decreasing slopes in the direction in which the layers are deposited in the soft magnetic substrate.

6. The agent of claim 2, wherein variation of coercivities is obtained by doping with at least one of hypophosphites and adjustment of current densities of the deposit.

7. The agent of claim 3, wherein variation of coercivities is obtained by doping with at least one of hypophosphites and adjustment of current densities of the deposit.

8. The agent of claim 1, wherein the layers are deposited by vacuum sputtering.

9. The agent of claim 2, wherein the layers are deposited by vacuum sputtering.

10. The agent of claim 3, wherein the layers are deposited by vacuum sputtering.

11. The agent of claim 4, wherein the layers are deposited by vacuum sputtering.

12. The agent of claim 5, wherein the layers are deposited by vacuum sputtering.

13. The agent of claim 6, wherein the layers are deposited by vacuum sputtering.

14. The agent of claim 7, wherein the layers are deposited by vacuum sputtering.

15. The agent of claim 1, wherein the layers are separated by fine nonmagnetic layers.

16. The agent of claim 2, wherein the layers are separated by fine nonmagnetic layers.

17. The agent of claim 3, wherein the layers are separated by fine nonmagnetic layers.

18. The agent of claim 4, wherein the layers are separated by fine nonmagnetic layers.

19. The agent of claim 5, wherein the layers are separated by fine nonmagnetic layers.

20. The agent of claim 6, wherein the layers are separated by fine nonmagnetic layers.

21. The agent of claim 7, wherein the layers are separated by fine nonmagnetic layers.

22. The agent of claim 8, wherein the layers are separated by fine nonmagnetic layers.

23. A method of printing using an agent, said agent including a plurality (k) of elementary magnetic layers disposed on a soft magnetic substrate and having relatively hard hysteresis cycles with a defined writing threshold and saturation magnetization, wherein at least one of a coercivity and a thickness of said layer varies as a function of a depth of the layer on said soft magnetic substrate, the method comprising the steps of:

providing a plurality of writing heads;

printing $n^2 \cdot k$ grey shades on a sheet of paper, wherein n is a number of dots used to define a pixel size and wherein said soft magnetic substrate is coated with k layers, enabling grey levels to be defined as a function of different thicknesses of the layers or of different coercivity of the layers;

applying a different writing threshold to each writing head of said plurality of writing heads, thereby obtaining k grey levels per elementary dot defined by different masses of toner retained per unit of surface area; and printing, with the plurality of heads having n×n points.

24. The method of claim 23, wherein the number n of dots equals 2, and the number k of layers equals 3.

25. The method of claim 23, wherein the number n of dots equals 2, and the number k of layers equals 2.

* * * * *